Dec. 14, 1965 I. L. JOY 3,223,856
WIDE RANGE MONOSTABLE MULTIVIBRATOR
Filed Aug. 20, 1963
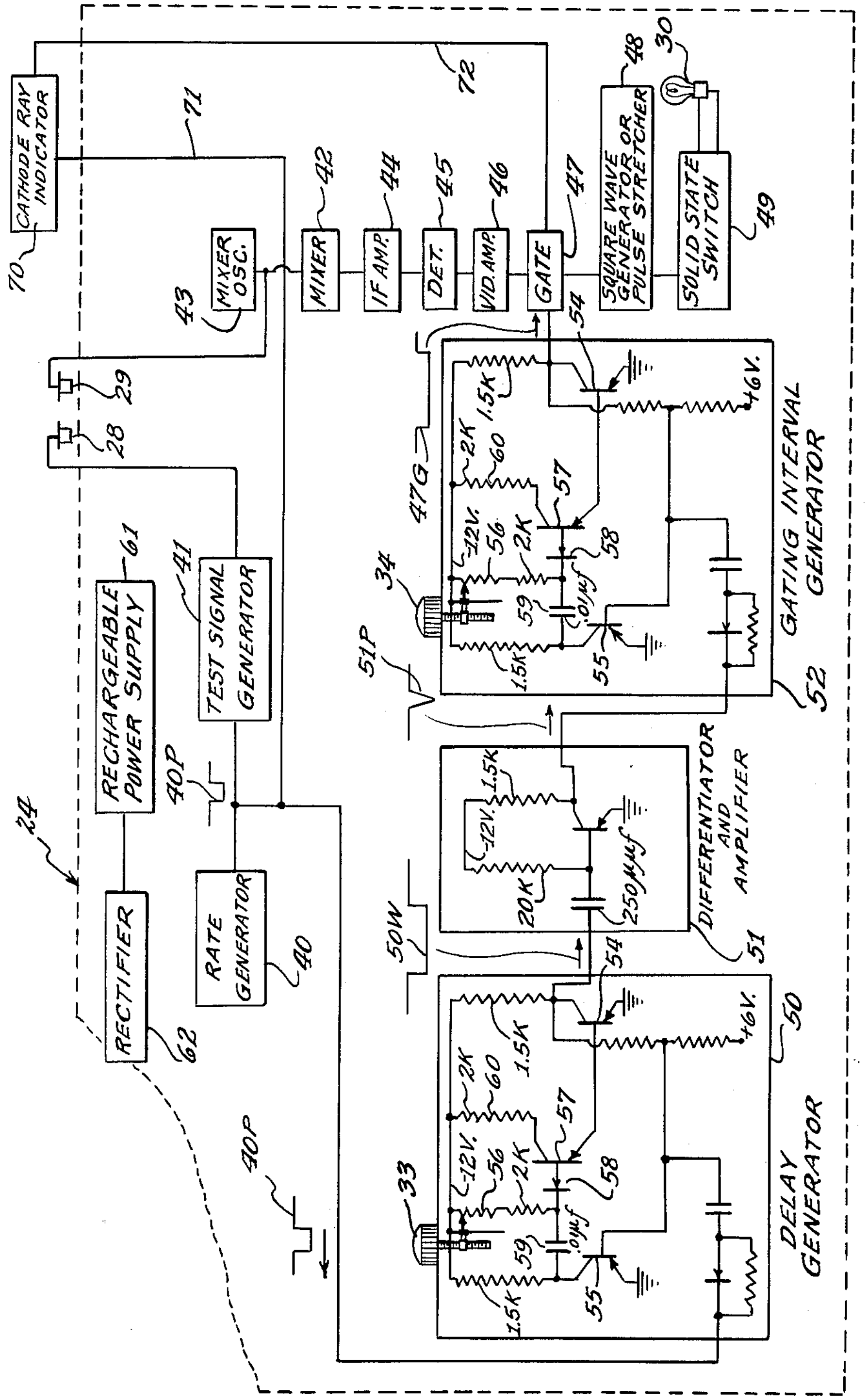

United States Patent Office 3,223,856

Patented Dec. 14, 1965

3,223,856

WIDE RANGE MONOSTABLE MULTIVIBRATOR

Ivan L. Joy, 1616 W. 29th St., Topeka, Kans.

Filed Aug. 20, 1963, Ser. No. 303,442
2 Claims. (Cl. 307—88.5)

This is a continuation-in-part of application Serial No. 178,654 filed March 9, 1962.

This invention relates to a variable time constant coupling circuit capable of driving a transistor to saturation at any point of the selected time range and more particularly, the invention is concerned with a one shot multivibrator arrangement incorporating a wide range coupling circuit that enables a time constant adjustment over a range from as low as 1 microsecond to as much as 10,000 microseconds.

The principal object is the provision of a coupling circuit having a time constant variable over a wide range while allowing for adequate current flow to insure driving a load transistor to saturation regardless of the particular operating point within such range.

A further object is the provision of a one shot multivibrator having such a coupling circuit wherein a timing resistance is variable over a wide range and is connected through a diode and current multiplying transistor to enable driving a load transistor to saturation when the resistance is at an extremely high value.

Other objects and advantages of the present invention will be apparent from the following description and claims, and are illustrated in the accompanying drawing which shows structure embodying preferred features of the present invention and the principles thereof, and what is now considered to be the best mode in which to apply these principles.

The single accompanying circuit is a block diagram of a solid state transceiver arrangement such as would be employed in ultrasonic flaw testing systems intended for general purpose use. Such a use requires a broad adjustment range in the gating function to enable selective inspection of regions of various breadth and of various range.

The circuit for the transceiver 24 as shown in block diagram form has transmitting equipment that includes a rate generator 40 supplying trigger pulses 40P to a test signal generator 41 that is connected to the sender crystal 28 that may be resonant at 2.5 megacycles. The rate generator 40 may be a blocking oscillator supplying trigger pulses of one to five microsecond duration at a rate of 2000 per second.

The test signal generator 41 may be a pulsed oscillator operating at a frequency selected in the range from 2 to 5 megacycles.

The receiving equipment of the transceiver includes a mixer 42 receiving input from the receiver crystal 29 and from a 17.5 megacycle mixer oscillator 43 to provide output at 15 megacycles. This output is fed successively to an I.F. amplifier 44, a detector 45, and a video amplifier 46.

A gate 47 controls indicator operation by controlling output from the video amplifier 46. In the drawing the indicator is a lamp 30 and in view of its relatively slow response, the output from the gate is connected to trigger a pulse stretcher 48 which actuates a solid state switch 49 that controls an energizing circuit for the lamp 30. The pulse stretcher 48 may be a square wave generator set to provide an elongated output pulse sufficient to insure operation of the light 30. The gate 47 is controlled by a square wave gating signal 47G that is derived from the trigger pulses 40P in synchronism with the test signals applied to the sender crystal 28. Thus, a delay generator 50 is connected to the rate generator to respond to each trigger pulse and produce an elongated square wave 50W that generates a delay corresponding to its length. A differentiator and amplifier unit 51 responds to the trailing edge of the delay square wave to produce a pulse 51P that triggers a gating interval generator 52 which provides the square wave gating signal 47G to control the gate 47.

To provide extended dynamic range adjustment for the gating signal 47G, the time delay for regulating the initiation of the gating signal is adjustable by the control 33 of the delay generator 50 and the actual time duration of the gating signal is adjustable by the control 34 on the gating interval generator 52. Each of the controls 33 and 34 is preferably calibrated.

Each of the time generators 50 and 52 is represented as a one-shot multivibrator that has an arrangement such that output transistor 54 is normally to be in a saturated state while input transistor 55 is normally to be cut off. In general, the time duration for a full cycle of operation of the multivibrator circuit employed in each of generators 50 and 52 is given by the RC time constant of potentiometer 56 and the 2K resistor in series therewith and capacitor 59.

For general purpose ultrasonic testing, it is important that each of the time generators 50 and 52 be adjustable over a broad range (for example: from 1 microsecond to 10,000 microseconds). Conventional transistorized one-shot multivibrator circuits are not capable of such a broad range of adjustment. For the illustrated circuit constants, where capacitor 59 is .01 microfarad and potentiometer is 1 megohm, it results that transistor 54 cannot be driven to saturation. There is not sufficient current flow available through resistor 56 to permit enough base current flow to transistor 54 for driving it to saturation. This condition limits the maximum range and maximum duration of the gating interval.

In accordance with this invention, a transistor 57 is connected in the couplig circuit between the collector of transistor 55 and the base of transistor 54 to amplify the current through resistor 56 and enable sufficient current flow through the base of transistor 54 as to ensure driving it to saturation.

The bridging transistor 57 is connected in an emitter follower configuration and its base lead has a diode 58 connected to the juncture of the timing resistor 56 with timing capacitor 59, its collector lead has a resistor 60 connected to the —12 volt supply bus, and its emitter is connected directly to the base of transistor 54.

This arrangement gives the transceiver the required dynamic range adjustment for operation at the various depth ranges encountered in the types of test application to which it is suited. In the block diagram for the transceiver a power supply 61 is shown comprised of rechargeable batteries arranged to be charged through a rectifier 62 adapted to be plugged into and receive power from a conventional 60 cycle A.C. source during the time when the transceiver is not being used for testing. Normally, a single charging operation will accommodate several days of testing. Connections from the power supply 61 to the various block elements are omitted in the diagram.

By way of illustration, typical circuit arrangements for the certain of the circuit components are listed below:

Rate Generator 40; Handbook of Industrial Electronic Control Circuits by John Markus and Vin Zeluff, page 310, Fig. 2.

Test Signal Generator 41; Handbook of Industrial Electronic Control Circuits by John Markus and Vin Zeluff, page 309, Fig. 1, drawing A.

Video Amplifier 46; Handbook of Industrial Electronic

Control Circuits by John Markus and Vin Zeluff, page 298, Fig. 1, drawing A.

Mixer 42 and Mixer Oscillator 43; General Electric Transistor Manual, Fifth Edition, page 67, Fig. 8.1.

Gate 47 and Switch 49; General Electric Transistor Manual, page 91, Fig. 10.4.

It should be understood that the description of the preferred form of the invention is for the purpose of complying with Section 112, Title 35, of the U.S. Code and that the appended claims should be construed as broadly as the prior art will permit.

What is claimed is:

1. In an adjustable range one-shot transistor multivibrator having an input transistor including base, emitter and collector elements connected normally to be cut off to respond to an input pulse at the base element to be rendered momentarily conducting for producing output at the collector element, an output transistor including base, emitter and collector elements connected normally to be saturated and a coupling circuit connected to feed output from the collector of said input transistor as input to the base element of said output transistor to cause said pulse acting through said input transistor to drive said output transistor to cut off, said coupling circuit including a timing capacitor, a diode, a wide range adjustable timing resistor connecting supply voltage to a juncture of said timing capacitor and said diode, and a transistor having a base connected through said diode to said juncture, a collector connected to the supply voltage and an emitter connected to the base of said output transistor.

2. An arrangement in accordance with claim 1 and wherein said resistor is variable over a range from as low as a few thousand ohms to as much as 100,000 ohms.

References Cited by the Examiner

UNITED STATES PATENTS

| | | |
|---|---|---|
| 2,987,632 | 6/1961 | Milford. |
| 3,068,406 | 12/1962 | Dellinger. |

FOREIGN PATENTS

| | | |
|---|---|---|
| 1,126,919 | 4/1962 | Germany. |

JOHN W. HUCKERT, *Primary Examiner.*